(12) United States Patent
Nakayama et al.

(10) Patent No.: US 12,709,237 B2
(45) Date of Patent: Aug. 18, 2026

(54) EMBLEM

(71) Applicant: KABUSHIKI KAISHA TOKAI-RIKA-DENKI-SEISAKUSHO, Aichi-ken (JP)

(72) Inventors: Daisuke Nakayama, Aichi (JP); Nobuhiro Kudo, Aichi (JP); Tomomi Hattori, Aichi (JP); Suguru Fujisaki, Aichi (JP)

(73) Assignee: KABUSHIKI KAISHA TOKAI-RIKA-DENKI-SEISAKUSHO, Aichi-ken (JP)

( * ) Notice: Subject to any disclaimer, the term of this patent is extended or adjusted under 35 U.S.C. 154(b) by 0 days.

(21) Appl. No.: 19/199,917

(22) Filed: May 6, 2025

(65) Prior Publication Data

US 2025/0347841 A1 Nov. 13, 2025

(30) Foreign Application Priority Data

May 8, 2024 (JP) ................................ 2024-075857

(51) Int. Cl.
*B60R 13/00* (2006.01)
*B60Q 1/56* (2006.01)
*F21V 8/00* (2006.01)

(52) U.S. Cl.
CPC .............. *B60R 13/005* (2013.01); *B60Q 1/56* (2013.01); *G02B 6/0018* (2013.01); *G02B 6/002* (2013.01); *G02B 6/0045* (2013.01); *G02B 6/0055* (2013.01); *G02B 6/006* (2013.01)

(58) Field of Classification Search
CPC ...... B60Q 1/0011; G02B 6/002; G02B 6/006; G02B 6/0015; G02B 6/0045; G02B 6/0055
See application file for complete search history.

(56) References Cited

U.S. PATENT DOCUMENTS

| | | | | |
|---|---|---|---|---|
| 8,705,914 B2 * | 4/2014 | Ghosh | .................. | H10F 77/488 359/853 |
| 2017/0357044 A1 | 12/2017 | Kuramitsu et al. | | |
| 2019/0001878 A1 * | 1/2019 | Schneider | ............. | G09F 21/049 |
| 2021/0009030 A1 * | 1/2021 | Ho | ....................... | B60Q 1/2696 |

FOREIGN PATENT DOCUMENTS

| | | |
|---|---|---|
| JP | 2017224413 A | 12/2017 |

OTHER PUBLICATIONS

Yan et al., Edge-Lighting Light Guide Plate Based on Micro-Prism for Liquid Crystal Display, Journal of Display Technology, vol. 5, No. 9, Sep. 2009 (Year: 2009).*

* cited by examiner

*Primary Examiner* — Keith G. Delahoussaye
(74) *Attorney, Agent, or Firm* — Dority & Manning, PA

(57) ABSTRACT

An emblem includes: a light source; a light guide through which light rays radiated from the light source are guided; an outer lens that contains a diffusion material which diffuses light rays in the outer lens, and that emits light rays by transmitting the light rays radiated from the light guide; and a housing in which the light guide is housed, to which an outer circumferential portion of the outer lens is bonded, and which has a space in which the light guide is disposed between the outer lens and the housing. The light source is disposed on an inner circumferential portion side of the outer lens when viewed from an outer lens side.

6 Claims, 2 Drawing Sheets

EMBLEM

CROSS-REFERENCE TO RELATED APPLICATION

This application is based on and claims priority under 35 USC 119 from Japanese Patent Application No. 2024-075857 filed on May 8, 2024, the disclosure of which is incorporated by reference herein.

BACKGROUND

Technical Field

The present disclosure relates to an emblem.

Related Art

Japanese Patent Application Laid-Open (JP-A) No. 2017-224413 discloses an emblem that emits light rays by transmitting, through an outer lens (ornament), light rays from a light source (LED) provided in a housing.

Incidentally, in a case where the light rays are emitted through an outer circumferential portion of the outer lens which corresponds to the vicinity of a bonding portion to the housing, it may be difficult to dispose, in the outer lens, the light source in the vicinity of the bonding portion to the housing. In this case, it is conceivable that uneven illuminance will occur at the outer circumferential portion of the outer lens in a light emitting state, but the configuration described in JP-A No. 2017-224413 leaves room for improvement in this regard.

SUMMARY

The present disclosure provides an emblem capable of reducing the occurrence of uneven illuminance at an outer circumferential portion of an outer lens in a light emitting state.

An emblem of a first aspect includes: a light source; a light guide through which light rays radiated from the light source are guided; an outer lens that contains a diffusion material which diffuses light rays in the outer lens, and that emits light rays by transmitting the light rays radiated from the light guide; and a housing in which the light guide is housed, to which an outer circumferential portion of the outer lens is bonded, and which has a space in which the light guide is disposed between the outer lens and the housing. The light source is disposed on an inner circumferential portion side of the outer lens when viewed from an outer lens side, and the light rays from the light source are guided to an outer circumferential portion of the light guide. The light rays from the light source guided to the light guide are guided from the light guide to the outer circumferential portion of the outer lens, and the light rays guided to the outer circumferential portion of the outer lens are diffused in the outer circumferential portion of the outer lens and are transmitted through the outer circumferential portion of the outer lens.

According to an emblem of a second aspect, in the emblem according to the first aspect, a surface of the outer circumferential portion of the outer lens on a side opposite from the housing is covered with a covering layer which is able to transmit light rays.

According to an emblem of a third aspect, in the emblem according to the second aspect, the covering layer is a metallic deposition film.

According to an emblem of a fourth aspect, in the emblem according to any one of the first to third aspects, the outer circumferential portion of the light guide is disposed along a bonding portion between the outer lens and the housing.

According to the emblem of the first aspect, the light rays radiated from the light source are guided to the light guide. The light rays of the light source guided to the light guide are guided from the light guide to the outer circumferential portion of the outer lens. The light rays guided to the outer circumferential portion of the outer lens are diffused in the outer circumferential portion of the outer lens and are transmitted through the outer circumferential portion of the outer lens. As described above, in the emblem according to the first aspect, even in a configuration in which the light source is disposed on a side of an inner circumferential portion of the outer lens when viewed from the outer lens side, the light rays from the light source can be guided to the outer circumferential portion of the outer lens. The light rays guided to the outer circumferential portion of the outer lens can be diffused in the outer circumferential portion of the outer lens and can be transmitted through the outer circumferential portion of the outer lens. Consequently, the occurrence of uneven illuminance along the outer circumferential portion of the outer lens can be reduced in a light emitting state.

According to the emblem of the second aspect, the surface of the outer circumferential portion of the outer lens on a side opposite to the housing is covered with a covering layer which is able to transmit light rays, thereby enabling effects due to the diffusion material of a design of the outer circumferential portion of the outer lens to be reduced.

According to the emblem of the third aspect, in a state in which the outer circumferential portion of the outer lens does not emit the light rays, metallic luster can be applied to the outer circumferential portion of the outer lens. It is possible to obtain light diffusion effects by the covering layer which is the metallic deposition film. Consequently, the occurrence of uneven illuminance along the outer circumferential portion of the outer lens can be still further reduced in a light emitting state.

According to the emblem of the fourth aspect, the outer circumferential portion of the light guide is disposed along the bonding portion between the outer lens and the housing, thereby enabling the light rays to be easily guided from the outer circumferential portion of the light guide to the outer circumferential portion of the outer lens.

BRIEF DESCRIPTION OF THE DRAWINGS

An exemplary embodiment of the present disclosure will be described in detail based on the following figures, wherein:

FIG. 1 is a front view illustrating a light emission emblem of an embodiment.

DETAILED DESCRIPTION

Figure 1:
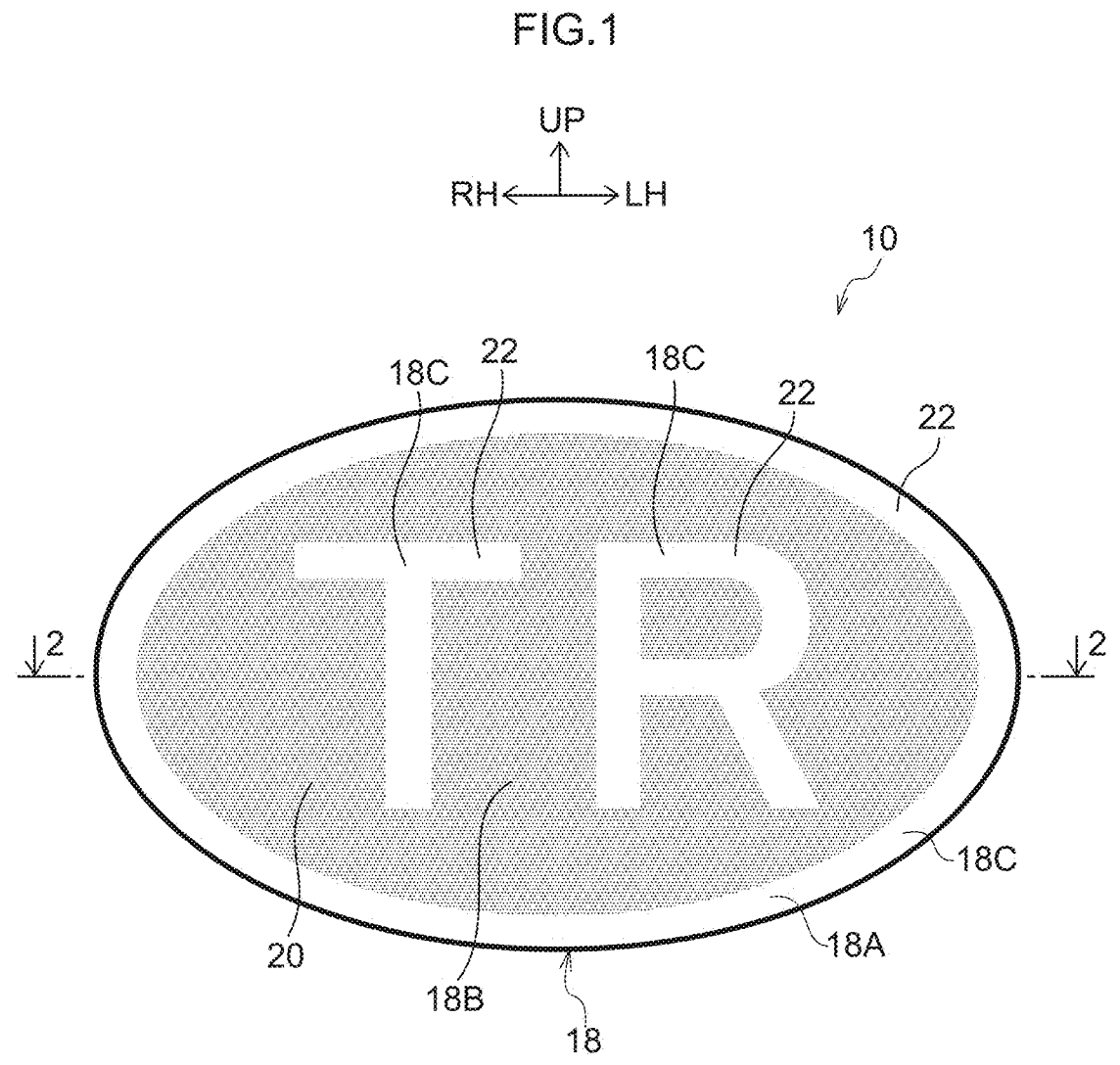
Figure 2:
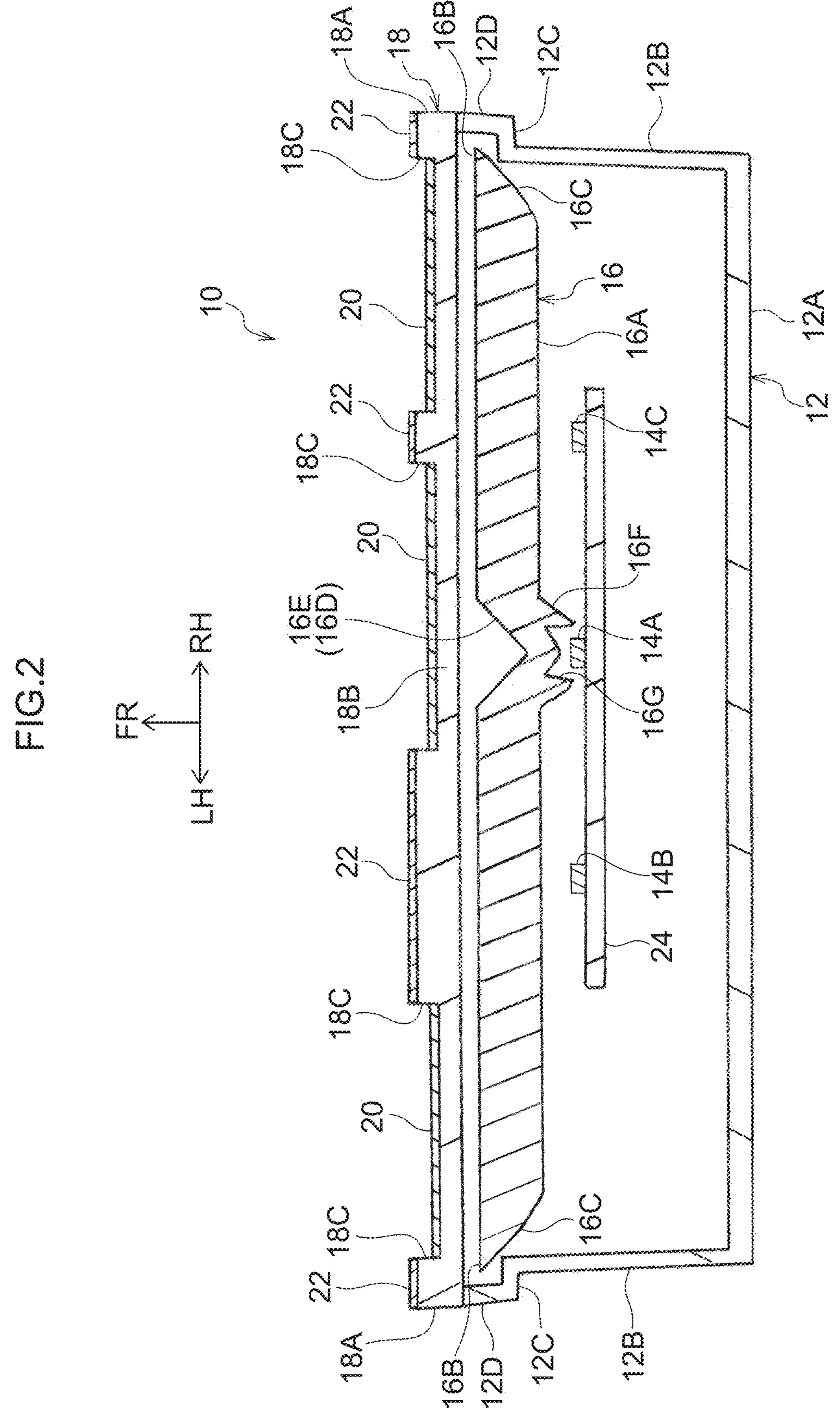
FIG. 2 is a cross-sectional view illustrating the light emission emblem taken along line 2-2 in FIG. 1.

FIG. 1 illustrates a light emission emblem 10 as an emblem of an embodiment. As illustrated in this figure, in the light emission emblem 10 of the embodiment, light rays transmitted through an outer circumferential portion 18A of an outer lens 18 to be described below are emitted to draw an elliptical annular shape, and light rays transmitted through an inner circumferential portion 18B of the outer lens 18 are emitted to draw characters of "TR". An arrow FR and an arrow UP illustrated in figures denote a frontward side and an upward side of the light emission emblem 10, respectively. An arrow RH and an arrow LH illustrated in the figures denote a right side and a left side of the light emission emblem 10, respectively. Hereinafter, in a case where descriptions are simply made using directions of front, rear, up, down, left, and right, the directions indicate front and rear in a front-rear direction of the light emission emblem 10, up and down in an up-down direction of the light emission emblem 10, and left and right in a left-right direction of the light emission emblem 10, respectively, unless otherwise noted.

As illustrated in FIGS. 1 and 2, the light emission emblem 10 includes a housing 12, a plurality of light sources 14A, 14B, and 14C provided in the housing 12, a light guide 16 provided in the housing 12, the outer lens 18 attached to the housing 12, and a mask 20 and a covering layer 22 which are formed on the outer lens 18.

As illustrated in FIG. 2, the housing 12 is formed in a box shape open on a frontward side thereof by using a resin material as an example. The housing 12 includes a bottom wall portion 12A extending in the up-down direction and the left-right direction and having a thickness direction parallel to the front-rear direction, a side wall portion 12B extending toward the frontward side from an outer circumferential end of the bottom wall portion 12A, and a distal end portion 12D extending from an end of the side wall portion 12B on a side opposite to the bottom wall portion 12A via a step portion 12C toward the frontward side. The distal end portion 12D is offset to a side opposite to the light guide 16 to be described below with respect to the side wall portion 12B.

The light sources 14A, 14B, and 14C are, for example, LEDs that emit light rays when energized, and are attached to a substrate 24. The light sources 14A, 14B, and 14C are supported by the housing 12 by fixing the substrate 24 to the housing 12. The light sources 14A, 14B, and 14C are disposed on a side of the inner circumferential portion 18B of the outer lens 18 when viewed from the outer lens 18 side. The light source 14A is mainly provided to cause the outer circumferential portion 18A of the outer lens 18 to emit light rays. The light sources 14B and 14C are provided to cause the inner circumferential portion 18B of the outer lens 18 to emit light rays.

The light guide 16 is formed using a transparent resin material as an example and guides the light rays radiated from the light source 14A. The light guide 16 includes a light guide main body portion 16A formed in a plate shape having a thickness direction parallel to the front-rear direction. An outer edge of the light guide main body portion 16A viewed from the frontward side has an elliptical shape. Outer circumferential surfaces of the outer circumferential portion 16B of the light guide main body portion 16A include inclined surfaces 16C inclined toward a side opposite to the center of the light guide main body portion 16A (the centroid when viewed from the frontward side) as the inclined surfaces become parts toward the frontward side. An inner circumferential portion of the light guide main body portion 16A has a tapered recess portion 16D open on the frontward side. An inner circumferential surface of the tapered recess portion 16D is a tapered surface 16E that narrows in a funnel shape from the frontward side toward the rear side. The light guide 16 includes a central projecting portion 16F projecting rearward from a location at which the tapered recess portion 16D is formed in the light guide main body portion 16A. A light source disposing recess portion 16G recessed toward the frontward side is formed in the central projecting portion 16F. The light source 14A is disposed in the light source disposing recess portion 16G.

The light guide 16 described above is supported by the housing 12 on the frontward side from the light sources 14A, 14B, and 14C. In a state in which the light guide 16 is supported by the housing 12, the outer circumferential portion 16B of the light guide main body portion 16A of the light guide 16 is disposed along a bonding portion between the distal end portion 12D and the outer lens 18 on the frontward side with respect to the step portion 12C formed in the housing 12.

As illustrated in FIGS. 1 and 2, the outer lens 18 is formed using, as an example, a transparent resin material containing a diffusion material which diffuses light rays, and light emission is performed in a range defined by transmitting light rays radiated from the above-described light guide 16. The outer lens 18 is formed in a plate shape having a thickness direction parallel to the front-rear direction. An outer edge of the outer lens 18 when viewed from the frontward side is formed in an elliptical shape corresponding to the light guide main body portion 16A. An end part of the outer circumferential portion 18A of the outer lens 18 is bonded to a front end of the distal end portion 12D of the housing 12. Consequently, an open end side of the housing 12 is closed by the outer lens 18. Here, a front surface portion of the outer circumferential portion 18A of outer lens 18 and a front surface portion of a part of the inner circumferential portion 18B of the outer lens 18 of the embodiment which emits light rays to draw the characters of "TR" become protrusion portions 18C projecting toward the frontward side with respect to the other regions of the front surface portion of the outer lens 18.

The mask 20 is a light shielding layer provided along a front surface of the outer lens 18 to disable transmission of light from a range different from the defined range in the outer lens 18. The mask 20 is, as an example, a coating film formed along the front surface of the outer lens 18. The mask 20 may be provided along a rear surface of the outer lens 18. In the embodiment, the mask 20 is provided in a range different from parts in the outer lens 18 which emit light rays (the outer circumferential portion 18A of the outer lens 18 and parts of the inner circumferential portion 18B of the outer lens 18 which emit light rays to draw the characters of "TR").

As illustrated in FIG. 2, the covering layer 22 is a metallic deposition film formed to cover the protrusion portion 18C of the outer lens 18 from the frontward side. The covering layer 22 has a film thickness to the extent that the light rays can be transmitted through the covering layer.

Operations and Effects of Embodiment

Next, operations and effects of the embodiment will be described.

As illustrated in FIGS. 1 and 2, in the light emission emblem 10 of the embodiment described above, the light rays radiated from the light sources 14B and 14C are transmitted through the light guide main body portion 16A of the light guide 16 and reach the inner circumferential portion 18B of the outer lens 18. The light rays from the light sources 14B and 14C which have reached the inner circumferential portion 18B of the outer lens 18 are transmitted through respective locations in the inner circumferential portion 18B of the outer lens 18 at which the mask 20 is not formed, while being diffused by the diffusion material in the inner circumferential portion 18B of the outer lens 18.

Consequently, the inner circumferential portion 18B of the outer lens 18 emits the light rays to draw the character of "TR".

On the other hand, the light rays radiated from the light source 14A are guided from the central projecting portion 16F of the light guide 16 to the light guide main body portion 16A. The light rays of the light source 14A guided to the light guide main body portion 16A are reflected from the tapered surface 16E of the tapered recess portion 16D and reach the inclined surface 16C of the outer circumferential portion 16B of the light guide main body portion 16A. Most of the light rays that have reached the inclined surface 16C are reflected toward the frontward side and are transmitted through the outer circumferential portion 18A of the outer lens 18 while being diffused by the diffusing material in the outer circumferential portion 18A of the outer lens 18. Consequently, the outer circumferential portion 18A of the outer lens 18 emits the light rays to draw an elliptical annular shape. As described above, in the light emission emblem 10 of the embodiment, even in the configuration in which the light source 14A is disposed on the side of the inner circumferential portion 18B of the outer lens 18 when viewed from the outer lens 18 side, the light rays from the light source 14A can be guided to the outer circumferential portion 18A of the outer lens 18. The light rays guided to the outer circumferential portion 18A of the outer lens 18 can be diffused in the outer circumferential portion 18A of the outer lens 18 and can be transmitted through the outer circumferential portion 18A of the outer lens 18. Consequently, the occurrence of uneven illuminance along the outer circumferential portion 18A of the outer lens 18 can be reduced in the light emitting state.

In the embodiment, the protrusion portion 18C that is a part of the outer lens 18 from which light emission is performed is covered with the covering layer 22 which is able to transmit the light rays. Consequently, effects due to the diffusion material of a design of the protrusion portion 18C of the outer lens 18 can be reduced. In addition to this, in the embodiment, the covering layer 22 is the metallic deposition film, thereby enabling metallic luster to be applied to the protrusion portion 18C in a state in which the protrusion portion 18C of the outer lens 18 does not emit the light rays. Diffusion effects of the light rays can be obtained by the covering layer 22 which is the metallic deposition film, thereby enabling the occurrence of uneven illuminance in the protrusion portion 18C of the outer lens 18 to be still further reduced in the light emitting state.

In the embodiment, the outer circumferential portion 16B of the light guide main body portion 16A of the light guide 16 is disposed along the bonding portion between the distal end portion 12D and the outer lens 18 on the frontward side with respect to the step portion 12C formed in the housing 12. In this configuration, the light rays can be easily guided from the outer circumferential portion 16B of the light guide main body portion 16A to the outer circumferential portion 18A of the outer lens 18.

In the embodiment, an example has been described in which the covering layer 22 that is the metallic deposition film is formed on the outer lens 18, but the disclosure is not limited thereto. A material of the covering layer 22 may be set, as appropriate, in consideration of a design or the like demanded for the light emission emblem 10. A configuration in which the covering layer 22 is not formed on the outer lens 18 can also be employed.

Although one embodiment of the disclosure has been described above, the disclosure is not limited to the above description, and it is needless to say that, in addition to the above descriptions, various modifications can be made without departing from the gist of the disclosure.

What is claimed is:

1. An emblem comprising:

a light source;

a light guide through which light rays radiated from the light source are guided;

an outer lens that contains a diffusion material which diffuses light rays in the outer lens, and that emits light rays by transmitting the light rays radiated from the light guide; and a housing in which the light guide is housed, to which an outer circumferential portion of the outer lens is bonded, and which has a space in which the light guide is disposed between the outer lens and the housing, wherein:

the light source is disposed on an inner circumferential portion side of the outer lens when viewed from an outer lens side, and the light rays from the light source are guided to an outer circumferential portion of the light guide, the light rays from the light source guided to the light guide are guided from the light guide to the outer circumferential portion of the outer lens, and the light rays guided to the outer circumferential portion of the outer lens are diffused in the outer circumferential portion of the outer lens and are transmitted through the outer circumferential portion of the outer lens, the outer lens and the light guide are spaced apart from each other, and when viewed from the outer lens side, an outer edge of the outer circumferential portion of the light guide is positioned on an inner circumferential side relative to an outer edge of the outer circumferential portion of the outer lens.

2. An emblem comprising:

a light source;

a light guide through which light rays radiated from the light source are guided;

an outer lens that contains a diffusion material which diffuses light rays in the outer lens, and that emits light rays by transmitting the light rays radiated from the light guide; and a housing in which the light guide is housed, to which an outer circumferential portion of the outer lens is bonded, and which has a space in which the light guide is disposed between the outer lens and the housing, wherein:

the light source is disposed on an inner circumferential portion side of the outer lens when viewed from an outer lens side, and the light rays from the light source are guided to an outer circumferential portion of the light guide, the light rays from the light source guided to the light guide are guided from the light guide to the outer circumferential portion of the outer lens, and the light rays guided to the outer circumferential portion of the outer lens are diffused in the outer circumferential portion of the outer lens and are transmitted through the outer circumferential portion of the outer lens, and a surface of the outer circumferential portion of the outer lens on a side opposite from the housing is covered with a covering layer which is able to transmit light rays.

3. The emblem according to claim 2, wherein the covering layer is a metallic deposition film.

4. The emblem according to claim 1, wherein the outer circumferential portion of the light guide is disposed along a bonding portion between the outer lens and the housing.

5. The emblem according to claim 1, wherein, when viewed from the outer lens side, the outer circumferential portion of the light guide is positioned on the inner circumferential side relative to a bonded portion of the outer circumferential portion of the outer lens, the bonded portion being bonded to the housing.

6. The emblem according to claim 1, wherein:

an outer circumferential surface of the outer circumferential portion of the light guide is an inclined surface inclined toward an outer circumferential side on progression toward the outer lens side, and the light rays from the light source are guided to the inclined surface of the light guide and are reflected from the inclined surface to the outer circumferential portion of the outer lens.

* * * * *